Aug. 11, 1931.   G. A. BARDET ET AL   1,818,524
KEY DIPPING MACHINE
Filed Feb. 6, 1928    3 Sheets-Sheet 1
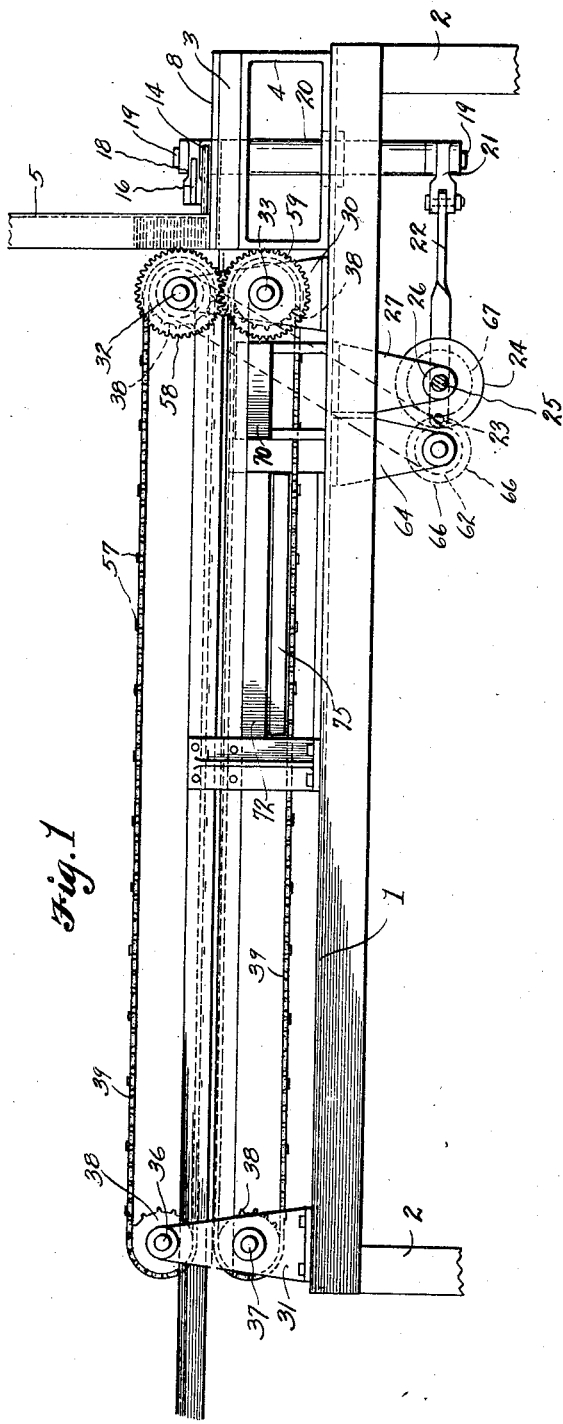
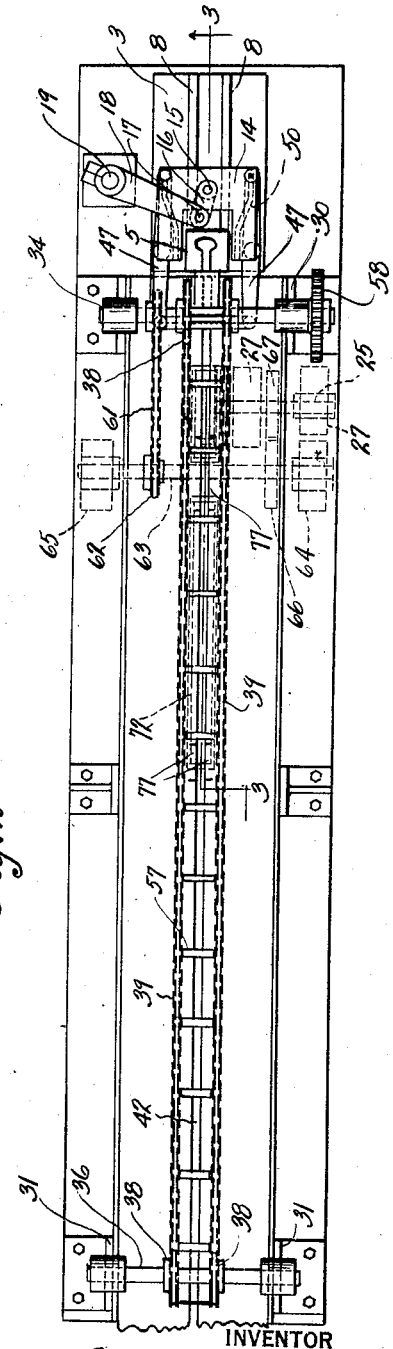
INVENTOR
GEORGE A. BARDET
GEORGE V. BARDET
BY
Cook & Robinson
ATTORNEY

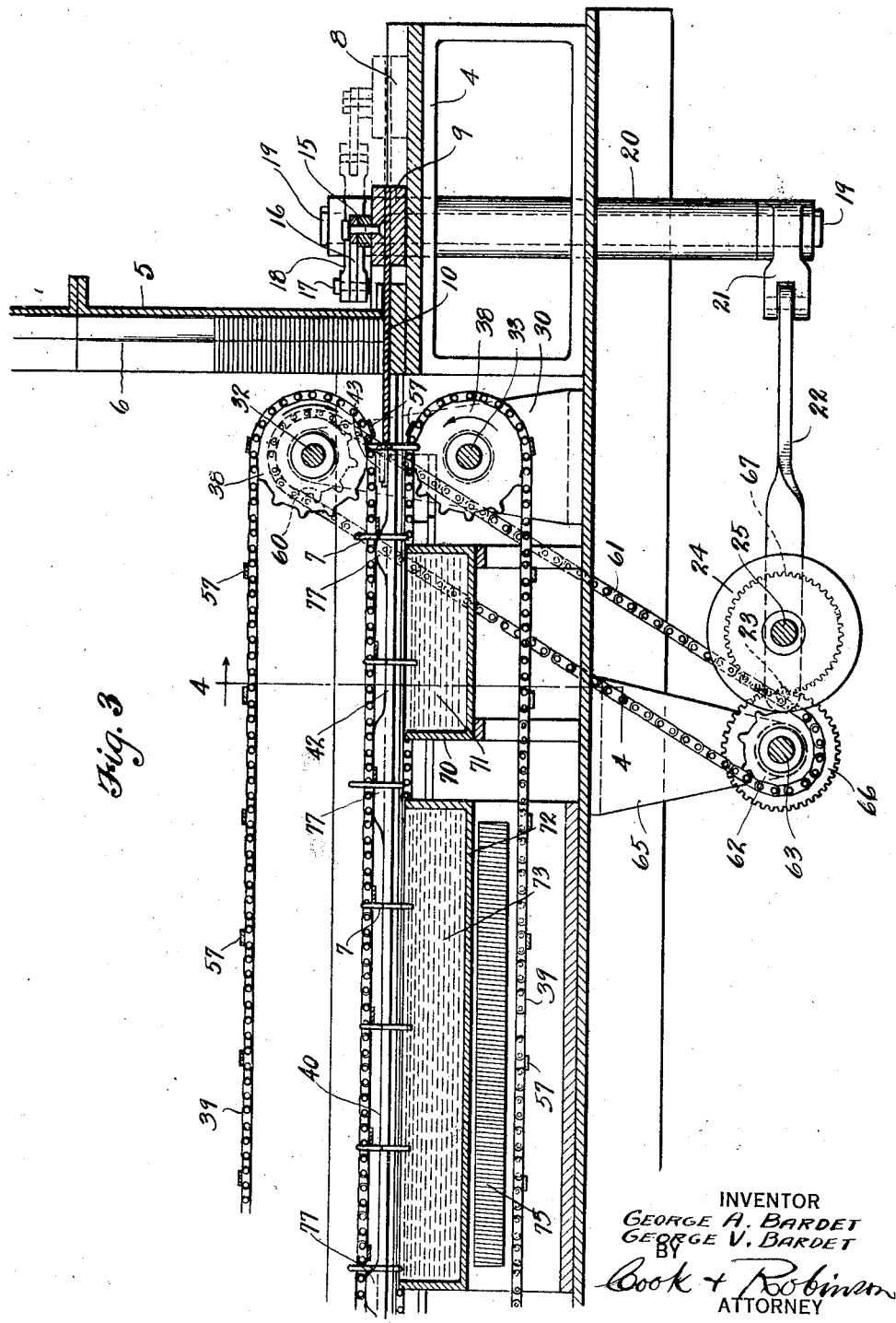

Aug. 11, 1931.    G. A. BARDET ET AL    1,818,524
KEY DIPPING MACHINE
Filed Feb. 6, 1928    3 Sheets-Sheet 3
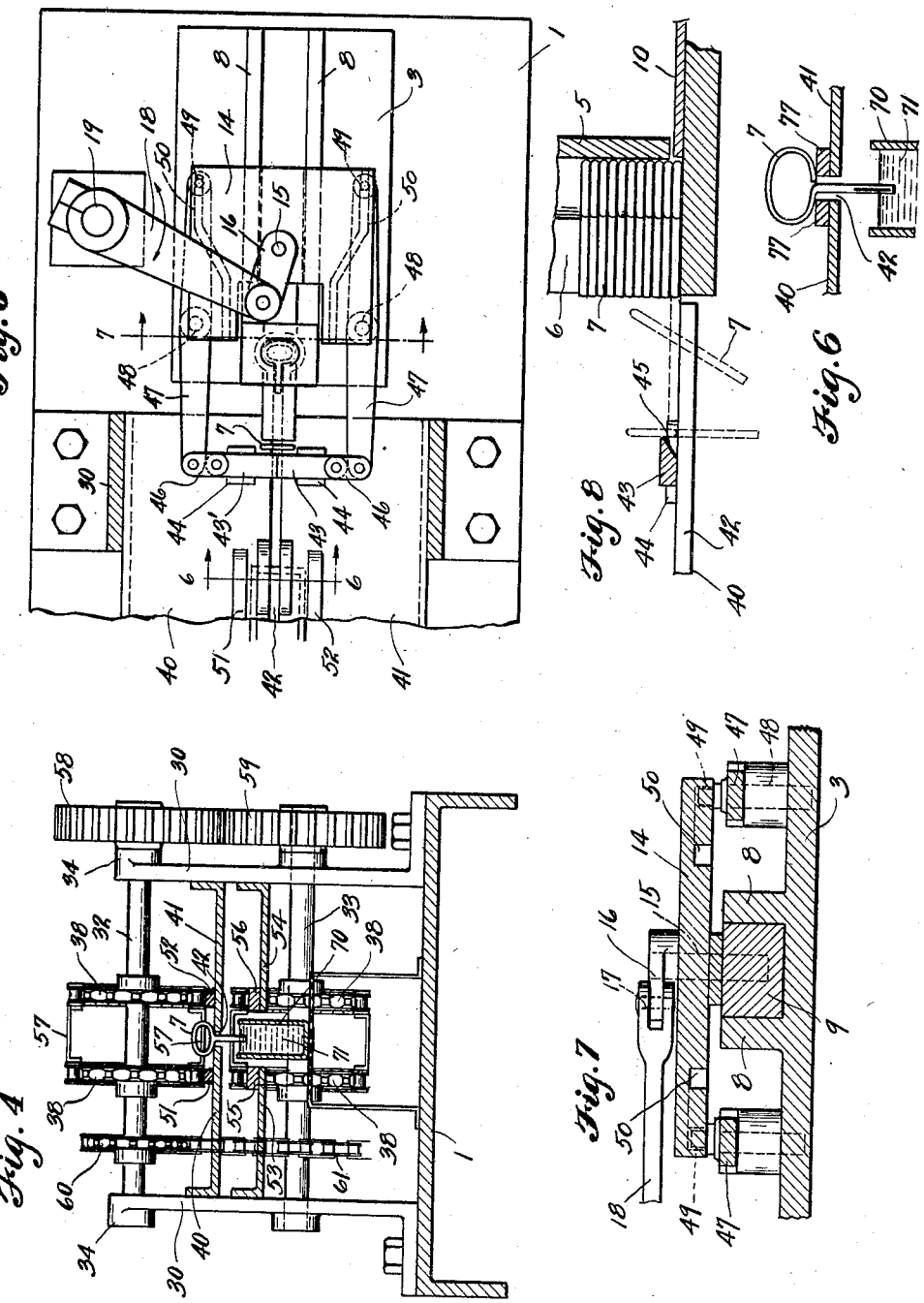
INVENTOR
GEORGE A. BARDET
GEORGE V. BARDET
BY
Cook & Robinson
ATTORNEY Patented Aug. 11, 1931

1,818,524

UNITED STATES PATENT OFFICE

GEORGE A. BARDET AND GEORGE V. BARDET, OF BERKELEY, CALIFORNIA, ASSIGNORS TO M. J. B. CO., OF SAN FRANCISCO, CALIFORNIA, A CORPORATION OF DELAWARE

KEY DIPPING MACHINE

Application filed February 6, 1928. Serial No. 252,357.

This invention relates to a key dipping machine, and more particularly to a machine for dipping keys, that are to be used with key opener cans, as a means of applying thereto a very small amount of solder which later on, when the keys are assembled with the cans, may be melted to solder the key to the can end or body.

Explanatory to the invention, it will be stated here that at the present time key opener cans are very extensively used and it is customary for canners to attach individual keys to the cans in some manner that they will be handy for use when the can is to be opened. One way of attaching the keys is to apply solder thereto after the keys have been assembled with their respective cans. In some instances, when the arrangement of the keys with the cans permits, the keys are attached by the same drop of solder that is applied to seal the opening through which the can is vacuumized. In either instance, the amount of solder used, when applied in this way, is greatly in excess of what is actually required to attach the keys, this being due principally to the fact that the methods and mechanisms heretofore used, as shown in U. S. Patent 1,512,459, did not provide for use of a smaller piece of solder.

In view of the above, it has been the principal object of this invention to provide a means for applying solder to keys which, by its use, will very greatly reduce the amount of solder ordinarily used and will make possible an easier, quicker and less expensive method of attaching keys to their cans.

More specifically stated, the invention resides in providing a machine whereby the keys, prior to their being assembled with their respective cans, may be dipped at their ends in solder so that a very small yet sufficient amount will adhere thereto and will harden and which, later on when the key is assembled with its can, may be melted by a suitable application of heat to the key to then serve as the medium for attaching the key to the can body or end.

It is also an object of the invention to provide a machine for the above stated purpose wherein there is a key supply magazine, a guideway through which keys may be delivered from the magazine, and a conveyer device whereby the keys may be advanced along the guideway in such manner that the end of each will be dipped, first, in a flux and then in solder and will then be carried through a cooling interval which permits the solder which adheres to the key to harden before the key is discharged from the machine.

Other objects reside in various details of construction of the feed mechanism, the guideways, conveyers and in the combination and mode of operation of parts that insures efficiency and safety in operation.

In accomplishing these objects, we have provided the improved details of construction, the preferred forms of which are illustrated in the accompanying drawings, wherein—

Figure 1 is a side elevation of a key dipping machine constructed according to the present invention.

Figure 2 is a plan, or top view of the same.

Figure 3 is an enlarged sectional view, taken substantially on the line 3—3 in Figure 2, showing the key dipping process.

Figure 4 is a cross sectional view, taken on the line 4—4 in Figure 3.

Figure 5 is a plan view, showing the means at one end of the machine whereby the keys are fed from the supply magazine into the machine.

Figure 6 is a sectional detail showing the means for lifting keys over the end walls of the flux and solder pots.

Figure 7 is a sectional view through the feed slide, taken on line 7—7 in Figure 5.

Figure 8 is a sectional detail, showing the feeding of a key from the magazine into the guide slot.

Referring more in detail to the drawings—

The working mechanism of the present machine is mounted upon a horizontally disposed bed plate 1 which may be supported in any suitable manner such as by the use of legs 2 at its ends. Mounted on one end of the bed plate, is a feed table 3 supported by end frames 4, and erected at the forward edge of this table, in the central longitudinal line of the machine, is a magazine 5 having a vertical channel 6 within which the keys, as designated at 7, which are to be dipped in solder, may be stacked flat, one upon another, in such manner that they will feed downwardly in the channel in accordance with the discharge of the keys from the lower end of the magazine.

Formed centrally on the table top 3, in the longitudinal direction of the machine, are parallel guide ribs 8—8 and reciprocally contained between these, is a feed block 9 from which a feed slide 10 extends forwardly, and which is adapted, on each forward movement of the slide, to push the lower key of the stack from the magazine into position to be advanced through the machine by a conveyer mechanism presently described. The keys, as stacked, are pushed end first from the magazine through a narrow base opening 12 in the latter through which the feed slide operates; this opening being of such height that but one key at a time can be discharged with each advance movement of the slide. Fixed to the upper face of the feed block is a flat plate 14 which is connected by a pivot pin 15 with a toggle link 16 which, in turn, connects by a pivot 17 with the swinging end of the feed slide actuating lever 18. This latter is fixed horizontally to the upper end of a rock shaft 19 and the rock shaft is carried in a vertical sleeve bearing 20 fixed to the bed plate and, at its lower end, has a lever arm 21 fixed thereto which is connected at its end to a link 22 which, in turn, is connected pivotally and eccentrically by a pin 23 to a wheel 24 on the end of a driven shaft 25 mounted revolubly in bearings 26 at the lower ends of supporting brackets 27—27 fixed to the under side of the bed plate. Rotation of shaft 25 causes the wheel 24 and link 22 to impart oscillatory motion to the shaft 19 and lever 18 which, in turn, causes reciprocal action of the feed slide and this results in delivering the keys, one at a time, from the lower end of the magazine.

Erected on the bed plate in paired relation adjacent the table 3 and at the other end of the machine, are standards 30—30 and 31—31, and extended between the first standards, in vertically spaced relation, are shafts 32 and 33 that are revolubly mounted in suitable bearings provided therefor, as at 34. Likewise, extended between the standards 31—31, are shafts 36 and 37. Fixed on each of these four shafts, in spaced relation, are two sprocket wheels 38, all of the same size, and extended about corresponding sprockets of corresponding shafts at the opposite ends of the machine, are chain belts 39; there being four of these belts and they are arranged to operate in parallel relation and so that the lower runs of the two upper belts are parallel to and operate in the same vertical planes as the upper runs of the two lower belts.

Fixed, respectively, to the standards at opposite sides of the machine, are horizontally extending plates 40 and 41 which have their adjacent edges disposed in spaced relation so as to provide an intermediate slot 42 as shown in Figures 3, 4 and 5, which extends the entire length of the machine. These plates are level with the discharge opening of the key magazine, and the slot end is so located with respect thereto that as keys are pushed from the magazine, their forward ends will drop downwardly through the slot and the keys will be held suspended by their looped upper ends or handle portions.

In order that any key, which does not of its own weight fall to vertical position as it is advanced from the feed magazine over slot 42, will be actuated to this position mechanically, there is provided a pair of slides 43—43' operable in guides 44 on plates 40—41 transversely of the slot at opposite sides thereof closely adjacent the magazine, as shown in Figure 5; the adjacent ends of these slides are adapted to be brought into abutment over the slot and their forward edges at this point are beveled, downwardly, as shown at 45 in Figure 8, so that the key end on striking this inclined surface will cause the key to swing down to vertical position. The slides are actuated inwardly and outwardly by connection at their outer ends with links 46 which, in turn, connect with lever arms 47 extended parallel with the feed slide at opposite sides thereof. These levers are centrally pivoted, as at 48, to the table 3 and have pins 49 at their outer ends extended into cam slots 50 in the under side of plate 14. Reciprocal action of the plate with the feed slide causes a synchronized action of the slides 43—43' which brings them into position at times when the keys are advanced and then draws them out so as to permit the keys to pass by when engaged by the forwardly moving cross bars of the conveyor chains presently described.

Fixed on the plates 40—41, parallel with and at opposite sides of the slot, are guide rails 51 and 52 on which the lower runs of the two upper belts travel. Likewise, on plates 53 and 54 that are also fixed to the brackets 30—31 in spaced relation below plates 40—41, are guide rails 55 and 56 on which the upper runs of the lower belts travel.

Extended horizontally between the paired upper belts and also between the paired lower belts, at regularly spaced intervals, are crossed bars 57 by means of which the keys are taken up after delivery from the magazine and are advanced along the slot from the magazine to the discharge end of the machine, these bars being so arranged on the belts and the belts being so driven that each key will be simultaneously engaged and advanced by a cross bar between the lower runs of the upper belts and a cross bar between the upper runs of the lower belts; the upper bar engaging the looped portion of the key and the lower bar engaging the key near its lower end.

For driving the belts, intermeshing gears 58—59 are provided on the ends of cross shafts 32 and 33 whereby the shafts are rotated at the same rate. Also, on shaft 32 there is keyed a sprocket wheel 60 that is driven by a chain belt 61 operating about it and about a sprocket wheel 62 on a cross shaft 63 supported below the bed plate by brackets 64—65. Driving connection between shafts 63 and 25 is provided by intermeshing gear wheels 66 and 67 keyed on these shafts.

Located between the belts and directly below the guide slot 42 and close to the receiving end, is a flux containing receptacle 70 which is kept substantially full of a liquid flux as designated at 71. Likewise, continuing from the receptacle 70 with a slight space between them, is a pot 72 of a substantial length in which melted solder, as designated at 73, is contained; this being kept in molten state by any suitable heating device, preferably of an electric character and automatically regulated, such a heating element being indicated at 75.

It will be stated here that, in the present instance, means is provided for automatically feeding solder to the pot so as to maintain a certain required level therein and also that an automatic device is used for maintaining the solder at a certain heat, but these devices are not illustrated herein as the operation of the dipping mechanism is not dependent on any particular construction of control devices; it being apparent that any suitable mechanism for this purpose could be used.

In use the device operates as follows: The keys 7 are stacked in the magazine and are delivered, one at a time, by action of the feed slide 10 into the slot 42 and they depend therefrom, as shown in Figures 3 and 4. The feed slide in its action moves the keys to a position at which they will be engaged by the next set of cross bars 57 brought into position by the conveyer belts as they travel about the sprocket wheels 38 on shafts 32 and 33. These bars advance the keys along the guide slot across the flux receptacle and solder pot and as they pass over these their lower ends are dipped, first in the flux and then in the solder, and a small amount of solder adheres to the key end. After leaving the solder pot, the key is carried through a relatively long cooling interval which gives it time to cool and the solder to harden on the key. If necessary, artificial cooling means may be used in connection with the device, such as a current of cold air delivered against the keys.

By extending the two upper guideways, on which the keys are carried, a substantial distance beyond the end of the conveyer belts 39 there is provided a holder wherein the keys are allowed to accumulate in an upright position for easy transfer to a portable expansion magazine from which they may be fed later on to the cans with which they are to be attached.

As a means of lifting the keys upwardly so that their lower ends will not be brought into contact with the end walls of the flux container or those of the solder pot in passing along the slot, there is provided on the plates 40—41 at opposite sides of the slot, the paired risers 77, over which the looped end of the key is carried and which causes the keys to be raised sufficiently that their lower ends will clear the end walls. As soon as the walls are cleared, the keys are again lowered.

There are two controlling factors in the amount of solder applied to the keys, namely, the temperature of the solder and the length of time the key end is submerged. Both of these can be accurately regulated by use of automatic devices for heat and speed control.

By this means and method of applying the solder, a very small amount is caused to adhere to the end of each key; then, when the keys are assembled with their cans, an electric circuit is passed through them and this causes the solder thereon to melt and, in cooling, to fix the key to the can. By this method a very small amount of solder is used compared to that required by other methods of attaching keys, and a more satisfactory, a quicker and a less expensive method of key attaching is made possible.

Having thus described our invention, what we claim as new therein and desire to secure by Letters-Patent, is:

1. A key dipping machine comprising a dip container, a key guide extended across said container and having a longitudinal base slot, a key containing magazine, a feed slide operable to deliver keys from the magazine into the guideway with their shank portions alined with and directly above the slot to fall of their own weight to a suspended position within the slot; and a conveyer having means for engaging the upper ends of the keys operable to advance the keys along the guide across the container to cause their lower ends only to contact with the dip.

2. A key dipping machine comprising an open top dip container, a slotted key guide extended across the container in which keys may be moved while suspended through the slot, a key magazine, a feed device for feeding keys singly from the magazine into the guideway with their shank portions alined with the slot to permit them to fall therethrough by their own weight and with their handle portions transversely of the slots to suspend the keys; and a conveyer belt comprising means at regular intervals to engage the keys after they have been moved to the suspended position to advance the keys in spaced relation along the guideway to cause their lower ends to be momentarially submerged in the dip.

3. In a key dipping machine, a dip container, a guideway extended over the container comprising spaced plates providing an intermediate slot through which the keys will depend and means for moving keys along the guide across the container; said guide being so disposed as to cause the ends of the keys to contact with the dip in passing over the container and risers fixed to the plates adjacent the slot and over which the keys are moved to cause them to be lifted clear of the container walls.

4. A dipping machine for keys having shank portions with loops at one end comprising a flux container, a solder container, a key container, a guideway having a longitudinal base slot within which keys may be moved with their ends suspended through the slot and which passes across said containers, a reciprocating slide for delivering keys one at a time into the guideway in a manner to cause the shank portions to be suspended through the slot by the loop portions thereof, and a conveyer including means at regular intervals, operable to move the keys along the guideway; said guideway being disposed so as to cause the keys in passing the containers to be dipped at their lower ends first in the flux and then in the solder, and risers in the guideway for lifting the keys to prevent their contacting with the walls of the containers.

5. A key dipping machine comprising a dip container, a slotted key guideway extended across the containers, a key supply magazine wherein keys may be stacked flat, a feed slide operable to deliver the keys from the magazine into the guideway so that their shank portions will swing downwardly through the slot, key positioning means operable from and across the guide slot and adapted to be engaged by keys which do not of their own weight fall to suspended position to insure this movement, and means for moving keys along the guideway and across the container to cause their lower ends to be dipped.

6. A device as in claim 5, wherein the key positioning means comprises reciprocating plates movable into the slot and provided with beveled surfaces against which key ends may be moved in contact with the feed slide to cause the key to be actuated to a suspended position within the key guide slot.

7. A key dipping machine comprising dip containers, a slotted guideway within which keys may be moved in suspended position, a key magazine, a feed slide operable to deliver keys from the magazine into the guideway and a conveyer for moving the keys along the guideway to cause their ends to be momentarially submersed in the dip in passing over the containers; said conveyer comprising paired belts operating parallel with the guideway at opposite sides of the slot and cross bars between said belts engageable with the keys to advance them.

8. A key dipping machine comprising a flux container, a solder container, a slotted guide extended across said containers and wherein keys may be held in suspended position, a key magazine having a base opening, a reciprocating feed slide operable to deliver keys, one at a time, from the opening into the guideway slot, paired belts operating parallel with the guideway and cross bars extended between the belts to engage the keys delivered into the guideway to advance them therealong; said guide being disposed so as to cause the ends of the keys to be momentarially submersed while passing over the containers, first in the flux and then in the solder, a means in the guideway across which the keys are moved to lift them clear of the container walls.

Signed at San Francisco, California, this 23rd day of January 1928.

GEORGE A. BARDET.
GEORGE V. BARDET.